(12) United States Patent
Miyaishi et al.

(10) Patent No.: US 10,457,290 B2
(45) Date of Patent: Oct. 29, 2019

(54) HYBRID VEHICLE CONTROL DEVICE

(71) Applicants: JATCO Ltd, Fuji-shi, Shizuoka (JP); NISSAN MOTOR CO., LTD., Yokohama-shi, Kanagawa (JP)

(72) Inventors: Hironori Miyaishi, Sagamihara (JP); Tomoyuki Mizuochi, Sagamihara (JP); Akito Suzuki, Tokyo (JP); Tetsuya Izumi, Ayase (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 237 days.

(21) Appl. No.: 15/555,261

(22) PCT Filed: Feb. 10, 2016

(86) PCT No.: PCT/JP2016/053907
§ 371 (c)(1),
(2) Date: Sep. 1, 2017

(87) PCT Pub. No.: WO2016/140027
PCT Pub. Date: Sep. 9, 2016

(65) Prior Publication Data
US 2018/0015929 A1    Jan. 18, 2018

(30) Foreign Application Priority Data

Mar. 5, 2015 (JP) .................................. 2015-043478

(51) Int. Cl.
*F16H 61/662* (2006.01)
*B60W 30/20* (2006.01)
(Continued)

(52) U.S. Cl.
CPC ............... *B60W 30/20* (2013.01); *B60K 6/48* (2013.01); *B60K 6/543* (2013.01); *B60L 50/16* (2019.02);
(Continued)

(58) Field of Classification Search
CPC .... B60W 10/107; B60W 20/00; B60W 20/40; B60W 2510/0266; B60W 2510/088;
(Continued)

(56) References Cited

U.S. PATENT DOCUMENTS 5,700,224 A * 12/1997 Suzuki ............. F16H 61/66272
477/44
9,915,343 B2 * 3/2018 Takemori .......... F16H 61/66272
(Continued)

FOREIGN PATENT DOCUMENTS

JP   2007-107653 A    4/2007
JP   2009-234563 A    10/2009
(Continued)

*Primary Examiner* — Sherry L Estremsky
(74) *Attorney, Agent, or Firm* — Foley & Lardner LLP

(57) ABSTRACT

An FF hybrid vehicle control device having an HEV mode and an EV mode as drive modes is provided with a CVT control unit (84) for determining primary pulley pressure (Ppri) and secondary pulley pressure (Psec) with which a belt (6c) of a belt-type continuously variable transmission (6) will be clamped on the basis of a torque component inputted to the belt-type continuously variable transmission (6) during brake deceleration, and the corrected amount of brake torque which is an inertia torque correction component. The CVT control unit (84) reduces the corrected amount of brake torque during brake deceleration when EV mode is selected to be less than the corrected amount of brake torque during brake deceleration when HEV mode is selected.

6 Claims, 10 Drawing Sheets

(51) Int. Cl.
  *B60K 6/48*   (2007.10)
  *B60K 6/543*  (2007.10)
  *B60W 10/02*  (2006.01)
  *B60W 10/10*  (2012.01)
  *B60W 20/00*  (2016.01)
  *F16H 59/04*  (2006.01)
  *F16H 61/02*  (2006.01)
  *B60W 10/107* (2012.01)
  *B60W 10/18*  (2012.01)
  *B60W 20/40*  (2016.01)
  *B60L 50/16*  (2019.01)
  *F16H 59/54*  (2006.01)

(52) U.S. Cl.
  CPC ............ *B60W 10/02* (2013.01); *B60W 10/10* (2013.01); *B60W 10/107* (2013.01); *B60W 10/18* (2013.01); *B60W 20/00* (2013.01); *B60W 20/40* (2013.01); *F16H 59/04* (2013.01); *F16H 61/02* (2013.01); *F16H 61/662* (2013.01); *F16H 61/66272* (2013.01); *B60W 2510/0266* (2013.01); *B60W 2510/088* (2013.01); *B60W 2510/1025* (2013.01); *B60W 2510/1095* (2013.01); *B60W 2510/18* (2013.01); *B60W 2710/021* (2013.01); *B60W 2710/025* (2013.01); *B60W 2710/10* (2013.01); *B60W 2710/18* (2013.01); *B60Y 2200/92* (2013.01); *F16H 59/54* (2013.01); *F16H 2061/66277* (2013.01)

(58) Field of Classification Search
  CPC ............ B60W 2510/1025; F16H 59/54; F16H 2061/66277; F16H 2061/66272
  See application file for complete search history.

(56) References Cited

U.S. PATENT DOCUMENTS

| | | | |
|---|---|---|---|
| 2010/0298092 | A1 | 11/2010 | Tsuchikawa |
| 2011/0106387 | A1* | 5/2011 | Takemori ............... F16H 59/54 701/53 |
| 2017/0204970 | A1* | 7/2017 | Honma ................. F16H 61/662 |
| 2018/0080552 | A1* | 3/2018 | Iwasa ..................... B60K 6/36 |

FOREIGN PATENT DOCUMENTS

| | | |
|---|---|---|
| JP | 2010-116120 A | 5/2010 |
| JP | 2013-221478 A | 10/2013 |
| WO | WO-2013/105444 A1 | 7/2013 |

\* cited by examiner

HYBRID VEHICLE CONTROL DEVICE

TECHNICAL FIELD

The present invention relates to a hybrid vehicle control device for a hybrid vehicle where a pulley pressure correction control is performed to raise a pulley pressure by a brake torque correction quantity based on an inertia torque under brake-deceleration.

BACKGROUND ART

Conventionally, a control device for a belt-type continuously variable transmission is known which is configured to raise a pulley pressure by a correction quantity based on an inertia torque in order to prevent a belt from slipping due to the inertia torque, under brake-deceleration (see a patent document 1, for example).

However, as applied to a hybrid vehicle, such a conventional device performs a pulley pressure correction to raise a pulley pressure by an identical correction quantity under brake-deceleration, irrespective of whether an EV mode is selected or an HEV mode is selected. This causes a problem that under brake-deceleration with the EV mode selected, wherein the EV mode is accompanied by a smaller inertia torque than the HEV mode, a secondary pulley pressure is increased unnecessarily by the correction, adversely affecting noise of a belt.

PRIOR ART DOCUMENT(S)

Patent Document(s)

Patent Document 1: JP 2007-107653 A

SUMMARY OF THE INVENTION

The present invention is made with attention to the problem described above, and is targeted for providing a hybrid vehicle control device for a hybrid vehicle with which noise of a belt in a belt-type continuously variable transmission is suppressed from being adversely affected under brake-deceleration with an EV mode selected.

In order to accomplish the target described above, according to the present invention, a hybrid vehicle control device for a hybrid vehicle, wherein: the hybrid vehicle includes a driveline, wherein the driveline includes an engine, a motor, and a belt-type continuously variable transmission; the belt-type continuously variable transmission includes a primary pulley, a secondary pulley, and a belt, wherein the belt is wound over the primary pulley and the secondary pulley, and configured to be clamped by a primary pulley pressure at the primary pulley and a secondary pulley pressure at the secondary pulley; and the hybrid vehicle employs an HEV mode and an EV mode as drive modes, wherein the HEV mode employs the engine and the motor as drive sources, and wherein the EV mode employs the motor as a drive source without employing the engine as a drive source; the hybrid vehicle control device comprises a pulley pressure correction control means configured to determine the primary pulley pressure and the secondary pulley pressure, based on an input torque component inputted to the belt-type continuously variable transmission, and a brake torque correction quantity as an inertia torque correction component, under brake-deceleration; wherein the pulley pressure correction control means is further configured to set smaller the brake torque correction quantity under brake-deceleration with the EV mode selected than that with the HEV mode selected.

Accordingly, the brake torque correction quantity under brake-deceleration with the EV mode selected is set smaller than that with the HEV mode selected. The components of the driveline to be considered to determine the brake torque correction quantity as the inertia torque correction component in the EV mode are different than those in the HEV mode. Specifically, in the EV mode where only the motor is employed as a drive source, the inertia torque is smaller than in the HEV mode where the engine and the motor are employed as drive sources. Accordingly, the brake torque correction quantity in the EV mode where the engine is not in direct connection to the belt-type continuously variable transmission, is treated independently of the brake torque correction quantity in the HEV mode, and is set smaller in conformance with the inertia torque in the EV mode than when the HEV mode is selected. This serves to suppress belt noise in the belt-type continuously variable transmission from being adversely affected under brake-deceleration with the EV mode selected, while preventing belt slip due to the inertia in each mode.

MODE(S) FOR CARRYING OUT THE INVENTION

Figure 1:
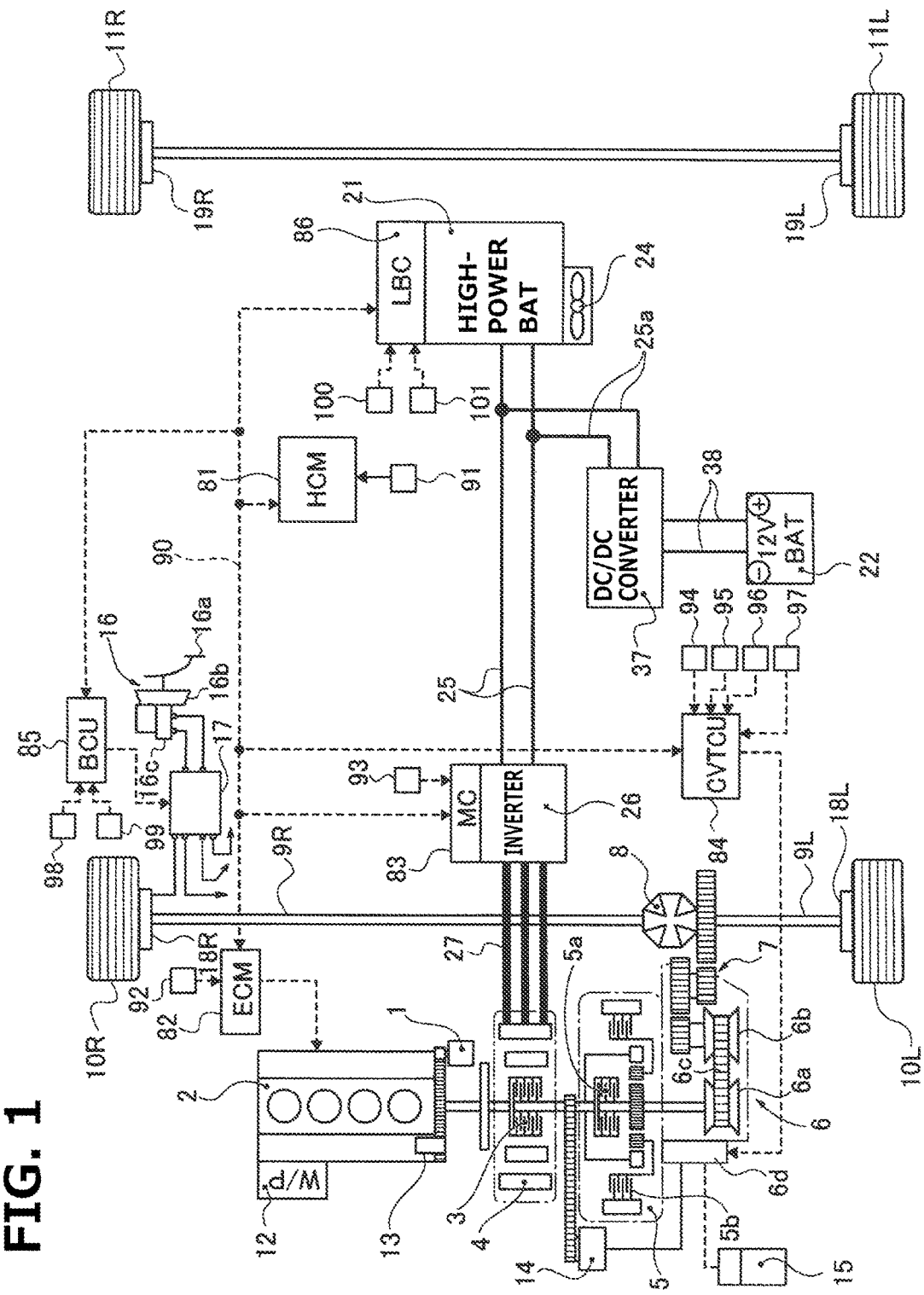
FIG. 1 is a whole system diagram showing an FF hybrid vehicle to which a control device according to a first embodiment is applied.

The following describes the best mode for carrying out a hybrid vehicle control device according to the present invention, with reference to a first embodiment shown in the drawings.

First Embodiment

First, the following describes configuration. The control device according to the first embodiment is applied to an FF hybrid vehicle as an example of hybrid vehicle where left and right front wheels are driving wheels, and a belt-type continuously variable transmission is mounted as a transmission. The following describes configuration of the control device of the FF hybrid vehicle according to the first embodiment, separately in sections [Whole System Configuration] and [Configuration of Process of Pulley Pressure Correction Control Under Brake-Deceleration].

[Whole System Configuration] FIG. 1 is a whole system diagram showing the FF hybrid vehicle to which the control device according to the first embodiment is applied. The following describes whole system configuration of the FF hybrid vehicle with reference to FIG. 1.

The FF hybrid vehicle includes a driveline including a transversely mounted engine 2, a first clutch 3 (CL1 for short), a motor generator 4 (MG for short), a second clutch 5 (CL2 for short), and a belt-type continuously variable transmission 6 (CVT for short), as shown in FIG. 1. Belt-type continuously variable transmission 6 includes an output shaft which is drivingly connected to left and right front wheels 10L, 10R via a final reduction gear train 7, a differential gear 8, and left and right drive shafts 9L, 9R. Left and right rear wheels 11L, 11R are non-driving wheels.

Transversely mounted engine 2 is arranged in a front room along with a starter motor 1, having a crankshaft axis in a vehicle lateral direction, and including an electric water pump 12 and a crankshaft rotation sensor 13, wherein crankshaft rotation sensor 13 is configured to sense reverse rotation of transversely mounted engine 2. Transversely mounted engine 2 employs a starter start mode and an MG start mode as start modes, wherein the starter start mode is configured to perform cranking by starter motor 1 with power supply from a 12V-battery 22, and wherein the MG start mode is configured to perform cranking by motor generator 4 with first clutch 3 slip-engaged. The starter start mode is selected in response to a satisfaction of a condition of low temperature or a condition of high temperature, whereas the MG start mode is selected in response to conditions other than the condition for starter starting.

Motor generator 4 is a three-phase alternating current permanent magnet type synchronous motor, which is connected to transversely mounted engine 2 via first clutch 3. Motor generator 4 is configured to receive power supply from a high-power battery 21 described below, and includes a stator coil connected to an inverter 26 via an AC harness 27, wherein inverter 26 is configured to convert a direct current to three-phase alternating currents in a state of power operation, and convert three-phase alternating currents to a direct current in a state of regenerative operation.

Second clutch 5 is a wet-type multiplate frictional clutch, which is disposed between motor generator 4 and left and right front wheels 10L, 10R as driving wheels, and is configured to be hydraulically operated, and controlled by a second clutch oil pressure into a completely engaged state, a slip-engaged state, or a disengaged state. In the first embodiment, second clutch 5 is implemented by a forward drive clutch 5a and a rearward drive clutch 5b, which are provided in a forward-rearward switching mechanism based on planetary gear arrangement. Specifically, during forward running, forward drive clutch 5a is employed as second clutch 5, and during rearward running, rearward drive clutch 5b is employed as second clutch 5.

Belt-type continuously variable transmission 6 includes a primary pulley 6a, secondary pulley 6b, and a belt 6c, wherein belt 6c is wound over pulleys 6a, 6b. Belt-type continuously variable transmission 6 is a transmission configured to vary a transmission ratio continuously by varying diameters of winding of belt 6c by a primary pressure and a secondary pressure which are supplied to a primary oil chamber and a secondary oil chamber, respectively. Belt-type continuously variable transmission 6 includes a main oil pump 14 (mechanism-driven) and an auxiliary oil pump 15 (motor-driven) as hydraulic pressure sources, wherein main oil pump 14 is configured to be rotationally driven by a motor shaft of motor generator 4 (i.e. transmission input shaft), and wherein auxiliary oil pump 15 is employed as an auxiliary pump. Belt-type continuously variable transmission 6 further includes a control valve unit 6d configured to produce a first clutch pressure, a second clutch pressure, the primary pressure, and the secondary pressure, based on a line pressure PL as an original pressure, wherein line pressure PL is generated by regulating a pump discharge pressure from the hydraulic pressure source.

A combination of first clutch 3, motor generator 4, and second clutch 5 forms a hybrid drive system of one-motor and two-clutch type, which employs an EV mode, an HEV mode, and a WSC mode as main drive modes. The EV mode is an electric vehicle mode configured to disengage first clutch 3, and engage second clutch 5, and thereby employ motor generator 4 only as a drive source, wherein running or driving in the EV mode is referred to as EV running or driving. The HEV mode is a hybrid vehicle mode configured to engage both of clutches 3, 5, and thereby employ transversely mounted engine 2 and motor generator 4 as drive sources, wherein running or driving in the HEV mode is referred to as HEV running or driving. The WSC mode is a CL2-slip-engaging mode configured to perform a motor rotational speed control of motor generator 4, and slip-engage second clutch 5 with an engagement torque capacity corresponding to a requested driving force, in the HEV mode or in the EV mode.

The FF hybrid vehicle includes a braking system including a brake operation unit 16, a brake fluid pressure control unit 17, left and right front wheel brake units 18L, 18R, and left and right rear wheel brake units 19L, 19R, as shown in FIG. 1. The braking system is configured to perform a cooperative regenerative control in response to a requested braking force by pedal operation, when regeneration is performed by motor generator 4 during brake operation, wherein the cooperative regenerative control is configured to set a hydraulic braking force to cover a component obtained by subtracting a regenerative braking force from the requested braking force.

Brake operation unit 16 includes a brake pedal 16a, a vacuum booster 16b, a master cylinder 16c, etc., wherein vacuum booster 16b is configured to employ a negative pressure of intake air of transversely mounted engine 2. Brake operation unit 16 is configured to generate a specific master cylinder pressure in response to a brake-depressing force of a driver applied to brake pedal 16a. Brake operation unit 16 has such a simple configuration employing no electric booster.

Brake fluid pressure control unit 17 includes an electric oil pump, a pressure-increasing solenoid valve, a pressure-reducing valve, an oil passage switching valve, etc., not shown. Brake fluid pressure control unit 17 is configured to be controlled by a brake control unit 85, to perform a function to generate wheel cylinder hydraulic pressures when no brake operation is made, and a function to regulate the wheel cylinder hydraulic pressures when brake operation is made. The function to generate the hydraulic pressures when no brake operation is made is employed by controls such as a traction control (TCS control), a vehicle behavior control (VDC control), and an emergency brake control (automatic brake control). The function to regulate the hydraulic pressures when brake operation is made is employed by controls such as a cooperative regenerative control, and an antilock brake control (ABS control).

Left and right front wheel brake units 18L, 18R are provided at left and right front wheels 10L, 10R, respectively, and left and right rear wheel brake units 19L, 19R are provided at left and right rear wheels 11L, 11R, respectively, for applying a hydraulic braking force to each wheel. Each brake unit 18L, 18R, 19L, 19R includes a wheel cylinder not shown which is configured to receive supply of brake fluid pressure generated by brake fluid pressure control unit 17.

The FF hybrid vehicle includes an electric power system which includes high-power battery 21 for power supply to motor generator 4, and 12V-battery 22 for power supply to a 12V-based load, as shown in FIG. 1.

High-power battery 21 is a secondary battery for power supply to motor generator 4, which is implemented by a lithium ion battery or the like where a cell module composed of multiple cells is set in a battery pack case. High-power battery 21 contains a junction box therein, wherein relay circuits are collected in the junction box for supply, breaking, and distribution of high power. High-power battery 21 is further provided with a cooling fan unit 24 having a battery cooling function, and a lithium battery controller 86 for monitoring the state of charge of the battery (battery SOC) and the temperature of the battery.

High-power battery 21 and motor generator 4 are connected to each other via a DC harness 25, inverter 26, and AC harness 27. Inverter 26 is provided with a motor controller 83 for control of power operation and regenerative operation. Namely, inverter 26 is configured to convert the direct current from DC harness 25 to the three-phase alternating currents to AC harness 27, when in a state of power operation where motor generator 4 is driven by discharging of high-power battery 21. On the other hand, inverter 26 is configured to convert the three-phase alternating currents from AC harness 27 to the direct current to DC harness 25, in a state of regenerative operation where high-power battery 21 is charged by generation of motor generator 4.

The 12V-battery 22 is a secondary battery mounted for power supply to a 12V-based load including the starter motor 1 and auxiliary equipment, which is implemented by a lead battery configured to be mounted in an engine vehicle or the like. High-power battery 21 and 12V-battery 22 are connected to each other via a DC branch harness 25a, a DC/DC converter 37, and a battery harness 38. The DC/DC converter 37 is configured to convert a voltage of hundreds volts from high-power battery 21 to a voltage of 12V, and configured to be controlled by a hybrid control module 81, to manage the quantity of charge of 12V-battery 22.

The FF hybrid vehicle includes an electronic control system including the hybrid control module 81 (HCM for short) as an electronic control unit having an integrated control function to suitably manage consumed energy of the whole of the vehicle, as shown in FIG. 1. The electronic control system further includes other electronic control units, namely, an engine control module 82 (ECM for short), motor controller 83 (MC for short), a CVT control unit 84 (CVTCU for short), brake control unit 85 (BCU for short), and lithium battery controller 86 (LBC for short). These electronic control units 81, 82, 83, 84, 85, 86 are connected to each other via a CAN communication line 90 (CAN is an abbreviation of Controller Area Network) for bidirectional exchange and sharing of information.

Hybrid control module 81 is configured to perform various integrated controls based on input information from the other electronic control units 82, 83, 84, 85, 86, an ignition switch 91, etc.

Engine control module 82 is configured to perform a start control, a fuel injection control, an ignition control, a fuel cut control, an engine idle rotational speed control, etc., of transversely mounted engine 2, based on input information from hybrid control module 81, an engine rotational speed sensor 92, etc.

Motor controller 83 is configured to perform a power operation control, a regeneration operation control, a motor creep control, a motor idle control, etc., by outputting a control command to inverter 26, based on input information from hybrid control module 81, a motor rotational speed sensor 93, etc.

The CVT control unit 84 is configured to output a control command to control valve unit 6d, based on input information from hybrid control module 81, an accelerator opening sensor 94, a vehicle speed sensor 95, an inhibitor switch 96, an ATF oil temperature sensor 97, etc. The CVT control unit 84 is configured to perform an engagement hydraulic pressure control of first clutch 3, an engagement hydraulic pressure control of second clutch 5, a shift hydraulic pressure control based on the primary pressure and the secondary pressure of belt-type continuously variable transmission 6, etc.

Brake control unit 85 is configured to output a control command to brake fluid pressure control unit 17, based on input information from hybrid control module 81, a brake switch 98, a brake stroke sensor 99, etc. Brake control unit 85 is configured to perform the TCS control, the VDC control, the automatic brake control, the cooperative regenerative brake control, the ABS control, etc.

Lithium battery controller 86 is configured to manage the battery SOC, the battery temperature, etc., of high-power battery 21, based on input information from a battery voltage sensor 100, a battery temperature sensor 101, etc.

Figure 2:
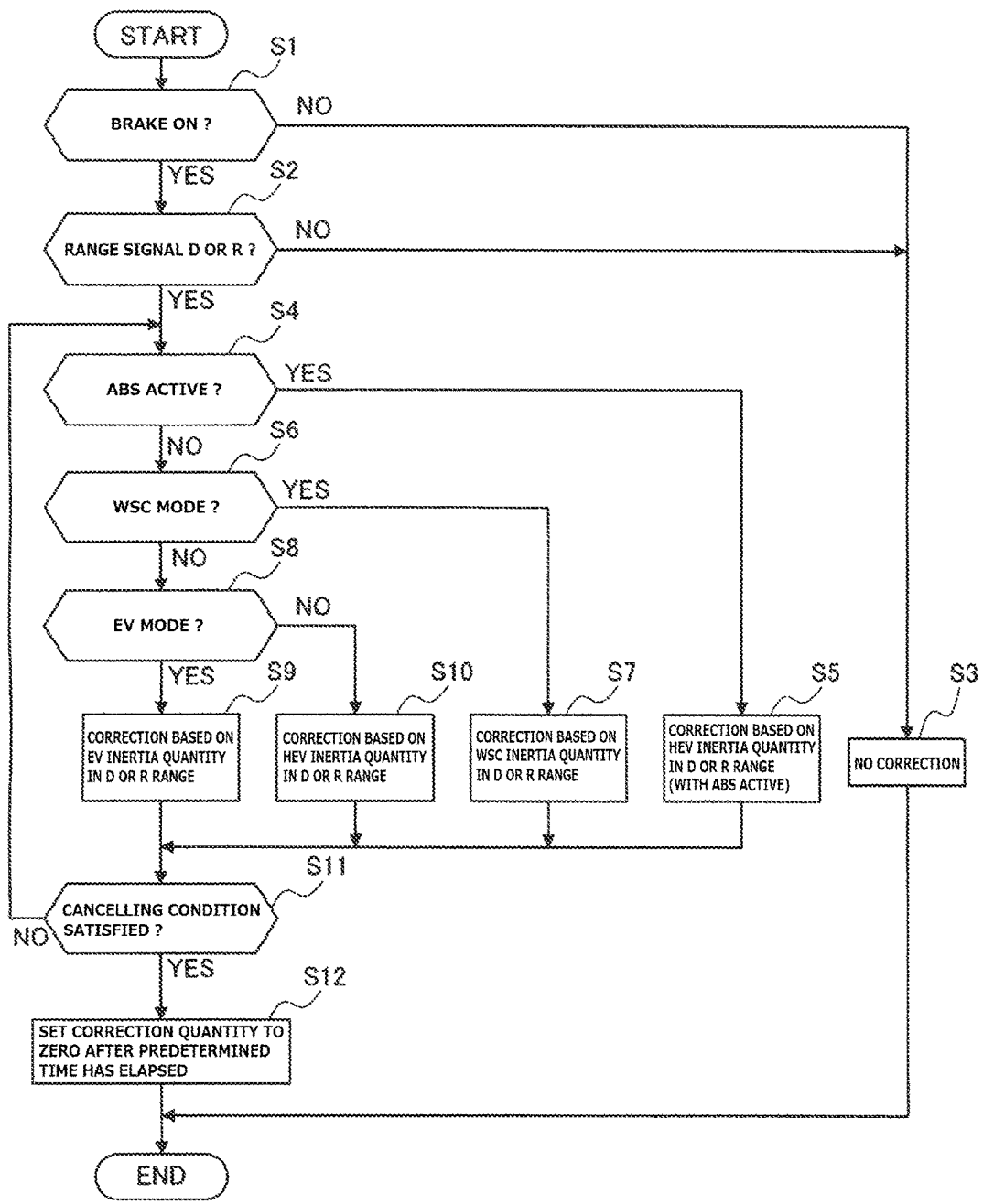
FIG. 2 is a flow chart showing a flow of a process of pulley pressure correction control under brake-deceleration, which is executed by a CVT control unit according to the first embodiment.

[Configuration of Process of Pulley Pressure Correction Control Under Brake-Deceleration] FIG. 2 shows a flow of a process of pulley pressure correction control under brake-deceleration where the vehicle is decelerated by the brake, which is executed by CVT control unit 84 according to the first embodiment (pulley pressure correction control means).

The following describes steps of FIG. 2 showing configuration of the process of pulley pressure correction control under brake-deceleration.

At Step S1, CVT control unit 84 determines whether or not brake operation is present. In case of YES (brake operation is present), CVT control unit 84 proceeds to Step S2. In case of NO (no brake operation is present), CVT control unit 84 proceeds to Step S3. With regard to presence and absence of brake operation, CVT control unit 84 determines that brake operation is present, when a switch signal from brake switch 98 is in on-state, and determines that no brake operation is present, when the switch signal is in off-state.

At Step S2, following the determination at Step S1 that brake operation is present, CVT control unit 84 determines whether or not a range signal from inhibitor switch 96 is a running or driving range, namely, a D-range or an R-range. In case of YES (the D-range or the R-range), CVT control unit 84 proceeds to Step S4. In case of NO (other than the D-range and the R-range), CVT control unit 84 proceeds to Step S3.

At Step S3, following the determination at Step S1 that no brake operation is present, or following the determination at Step S2 that the range signal indicates one other than D-range and R-range, CVT control unit 84 determines pulley pressure command values of primary pulley pressure Ppri and secondary pulley pressure Psec, without calculating a brake torque correction quantity, and then proceeds to the end. In case of "no correction", CVT control unit 84 estimates an input torque to belt-type continuously variable transmission 6, based on an accelerator opening APO, etc., and determines pulley clamping forces for suppressing belt slip against the estimated input torque, and determines the pulley pressure command values of primary pulley pressure Ppri and secondary pulley pressure Psec for obtaining the pulley clamping forces (only for the input torque component). In a transient phase of shifting where the transmission ratio is changing, each pulley pressure command value is corrected by a shifting correction for promoting the progress of the shifting, as compared to the pulley pressure command value in a situation where the transmission ratio is maintained.

At Step S4, following the determination at Step S2 that the range signal indicates the D-range or the R-range, or following a determination at Step S11 that a cancelling condition is unsatisfied, CVT control unit 84 determines whether or not the ABS is active. In case of YES (the ABS is active), CVT control unit 84 proceeds to Step S5. In case of NO (the ABS is inactive), CVT control unit 84 proceeds to Step S6. With regard to the determination whether or not the ABS is active, CVT control unit 84 determines that the ABS is active, when an ABS activity flag provided by brake control unit 85 is equal to 1, and determines that the ABS is inactive, when the ABS activity flag is equal to zero.

Figure 3:
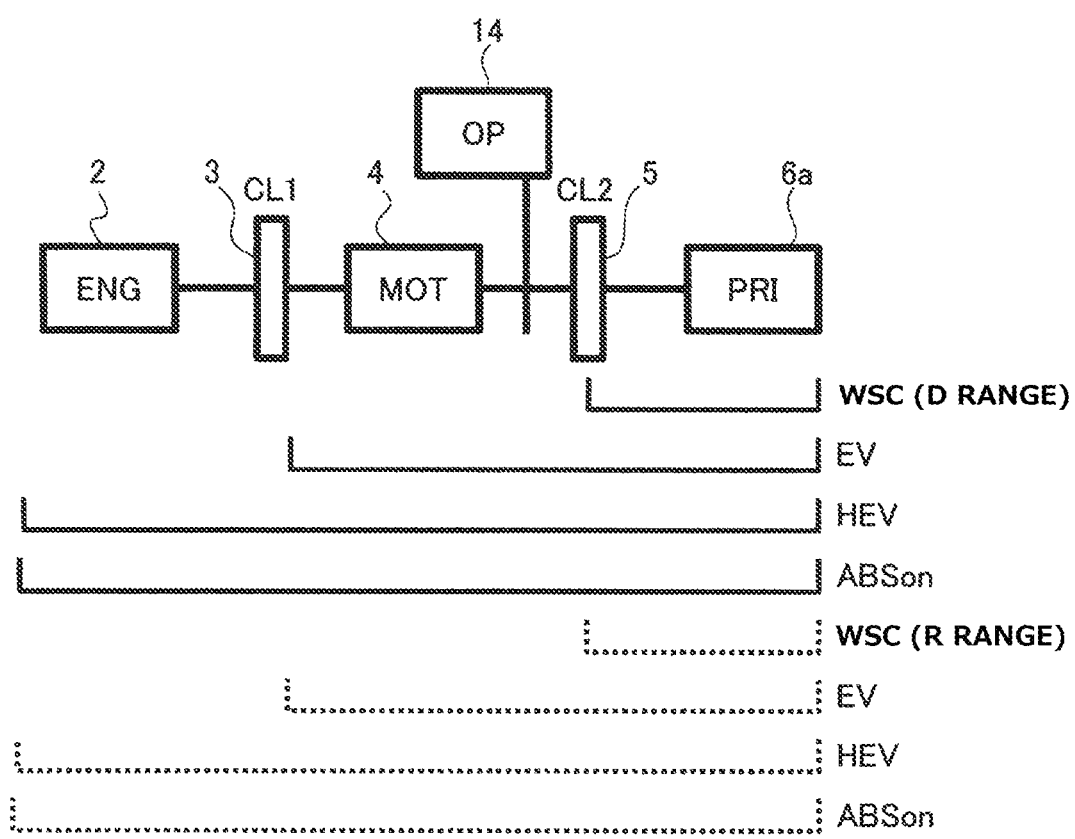
FIG. 3 is an illustrative diagram showing which components of a driveline should be taken into account to determine a brake torque correction quantity as an inertia torque correction component in the FF hybrid vehicle according to the first embodiment, separately in a WSC mode, in an EV mode, in an HEV mode, and in an ABS-active state.

At Step S5, following the determination at Step S4 that the ABS is active, CVT control unit 84 calculates a brake torque correction quantity based on an HEV inertia quantity, and determines the pulley pressure command values of primary pulley pressure Ppri and secondary pulley pressure Psec, and then proceeds to Step S11. The inertia quantity when the ABS is active is regarded as an inertia quantity based on an inertia torque of a combination of transversely mounted engine 2, first clutch 3, motor generator 4, main oil pump 14, second clutch 5, and primary pulley 6a, as indicated by "ABS on" in FIG. 3. CVT control unit 84 adds the HEV inertia quantity as the inertia torque correction component to the input torque component inputted to belt-type continuously variable transmission 6 such as the hydraulic torque and the regenerative torque, to obtain a total torque, and determines the pulley pressure command values of primary pulley pressure Ppri and secondary pulley pressure Psec to set the torque capacity enough to prevent slip of pulleys 6a, 6b with belt 6c wounded over pulleys 6a, 6b even when the total torque is inputted. The brake torque correction quantity when the ABS is active in the D-range is different from that in the R-range, because the transmission ratio is different.

At Step S6, following the determination at Step S5 that the ABS is inactive, CVT control unit 84 determines whether or not it is in a state where the WSC mode is selected. In case of YES (in the state of the WSC mode), CVT control unit 84 proceeds to Step S7. In case of NO (in a state other than the WSC mode), CVT control unit 84 proceeds to Step S8. With regard to the state of the WSC mode, CVT control unit 84 identifies the state of the WSC mode based on determination that the engagement capacity of second clutch 5 (CL2) corresponds to the requested driving torque, and second clutch 5 (CL2) is in the state of slip-engagement.

At Step S7, following the determination at Step S6 that it is in the state of the WSC mode, CVT control unit 84 calculates a brake torque correction quantity based on a WSC inertia quantity, and determines the pulley pressure command values of primary pulley pressure Ppri and secondary pulley pressure Psec, and then proceeds to Step S11. The WSC inertia quantity is regarded as an inertia quantity of small correction based on an inertia torque of a combination of second clutch 5, and primary pulley 6a of belt-type continuously variable transmission 6, as indicated by "WSC" in FIG. 3. CVT control unit 84 adds the WSC inertia quantity as the inertia torque correction component to the input torque component inputted to belt-type continuously variable transmission 6 such as the hydraulic torque and the regenerative torque, to obtain a total torque, and determines the pulley pressure command values of primary pulley pressure Ppri and secondary pulley pressure Psec to set the torque capacity enough to prevent slip of pulleys 6a, 6b with belt 6c wounded over pulleys 6a, 6b even when the total torque is inputted. The WSC inertia quantity in the D-range is different from that in the R-range, because the transmission ratio is different.

At Step S8, following the determination at Step S6 that it is in the state other than the WSC mode, CVT control unit 84 determines whether or not it is in a state where the EV mode is selected. In case of YES (in the state of the EV mode), CVT control unit 84 proceeds to Step S9. In case of NO (in the HEV mode), CVT control unit 84 proceeds to Step S10. With regard to the state of the EV mode, CVT control unit 84 identifies the state of the EV mode based on determination that first clutch 3 (CL1) is disengaged and second clutch 5 (CL2) is engaged.

At Step S9, following the determination at Step S8 that it is in the state of the EV mode, CVT control unit 84 calculates a brake torque correction quantity based on an EV inertia quantity, and determines the pulley pressure command values of primary pulley pressure Ppri and secondary pulley pressure Psec, and then proceeds to Step S11. The EV inertia quantity is regarded as an inertia quantity of middle correction based on an inertia torque of a combination of motor generator 4, main oil pump 14, second clutch 5, and primary pulley 6a, as indicated by "EV" in FIG. 3. CVT control unit 84 adds the EV inertia quantity as the inertia torque correction component to the input torque component inputted to belt-type continuously variable transmission 6 such as the hydraulic torque and the regenerative torque, to obtain a total torque, and determines the pulley pressure command values of primary pulley pressure Ppri and secondary pulley pressure Psec to set the torque capacity enough to prevent slip of pulleys 6a, 6b with belt 6c wounded over pulleys 6a, 6b even when the total torque is inputted. The EV inertia quantity in the D-range is different from that in the R-range, because the transmission ratio is different.

At Step S10, following the determination at Step S8 that it is in the state of the HEV mode, CVT control unit 84 calculates a brake torque correction quantity based on an HEV inertia quantity, and determines the pulley pressure command values of primary pulley pressure Ppri and secondary pulley pressure Psec, and then proceeds to Step S11. The HEV inertia quantity is regarded as an inertia quantity of large correction based on an inertia torque of a combination of transversely mounted engine 2, first clutch 3, motor generator 4, main oil pump 14, second clutch 5, and primary pulley 6a, as indicated by "HEV" in FIG. 3. CVT control unit 84 adds the HEV inertia quantity as the inertia torque correction component to the input torque component inputted to belt-type continuously variable transmission 6 such as the hydraulic torque and the regenerative torque, to obtain a total torque, and determines the pulley pressure command values of primary pulley pressure Ppri and secondary pulley pressure Psec to set the torque capacity enough to prevent slip of pulleys 6a, 6b with belt 6c wounded over pulleys 6a, 6b even when the total torque is inputted. The HEV inertia quantity in the D-range is different from that in the R-range, because the transmission ratio is different. The WSC inertia quantity, the EV inertia quantity, and the HEV inertia quantity are in a relationship of (the WSC inertia quantity <the EV inertia quantity <the HEV inertia quantity).

At Step S11, following the correction at Step S5, S7, S9, or S10, CVT control unit 84 determines whether or not the condition for cancelling the pulley pressure correction control is satisfied. In case of YES (the cancelling condition is satisfied), CVT control unit 84 proceeds to Step S12. In case of NO (the cancelling condition is unsatisfied), CVT control unit 84 proceeds back to Step S4. CVT control unit 84 determines that the condition for cancelling the pulley pressure correction control is satisfied, when a condition of brake-off is satisfied, or when a vehicle speed condition is satisfied where a vehicle speed VSP becomes lower than or equal to a vehicle stop determination vehicle speed.

At Step S12, following the determination at Step S11 that the cancelling condition is satisfied, CVT control unit 84 maintains the brake torque correction quantity for a predetermined time period from the satisfaction of the cancelling condition, and then reduces the brake torque correction quantity to zero, and then proceeds to the end. The predetermined time period is predetermined as a timer time period or the like suitable for extension of the correction.

The following describes actions of the control device for the FF hybrid vehicle according to the first embodiment, separately in sections [Action of Process of Pulley Pressure Correction Control Under Brake-Deceleration], [Action of Pulley Pressure Correction Control Under Brake-Deceleration and Others], and [Characteristic Action of Pulley Pressure Correction Control].

Figure 4:
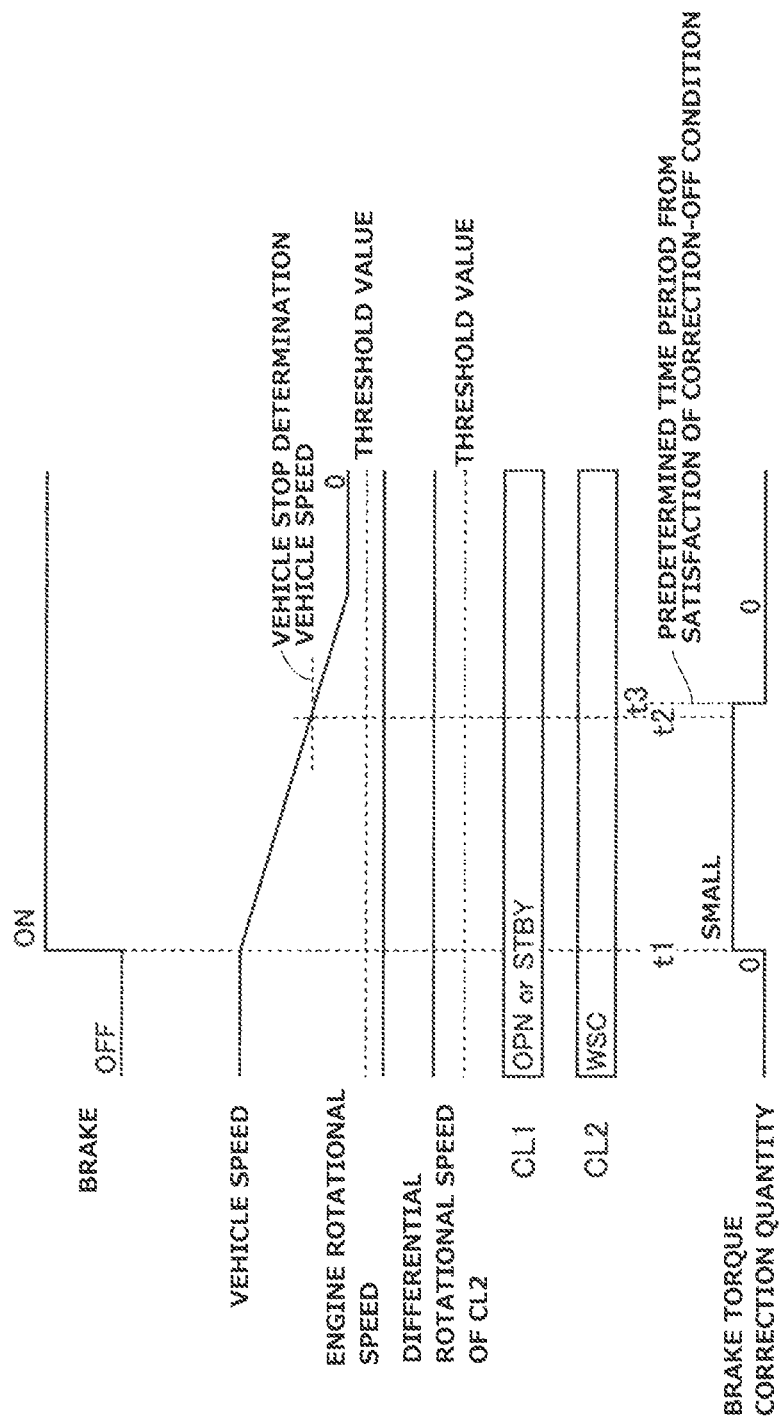
FIG. 4 is a time chart showing characteristics of a brake, a vehicle speed, an engine rotational speed, a differential rotational speed, a state of CL1, a state of CL2, and a brake torque correction quantity, when the WSC mode is selected in the FF hybrid vehicle according to the first embodiment.
Figure 5:
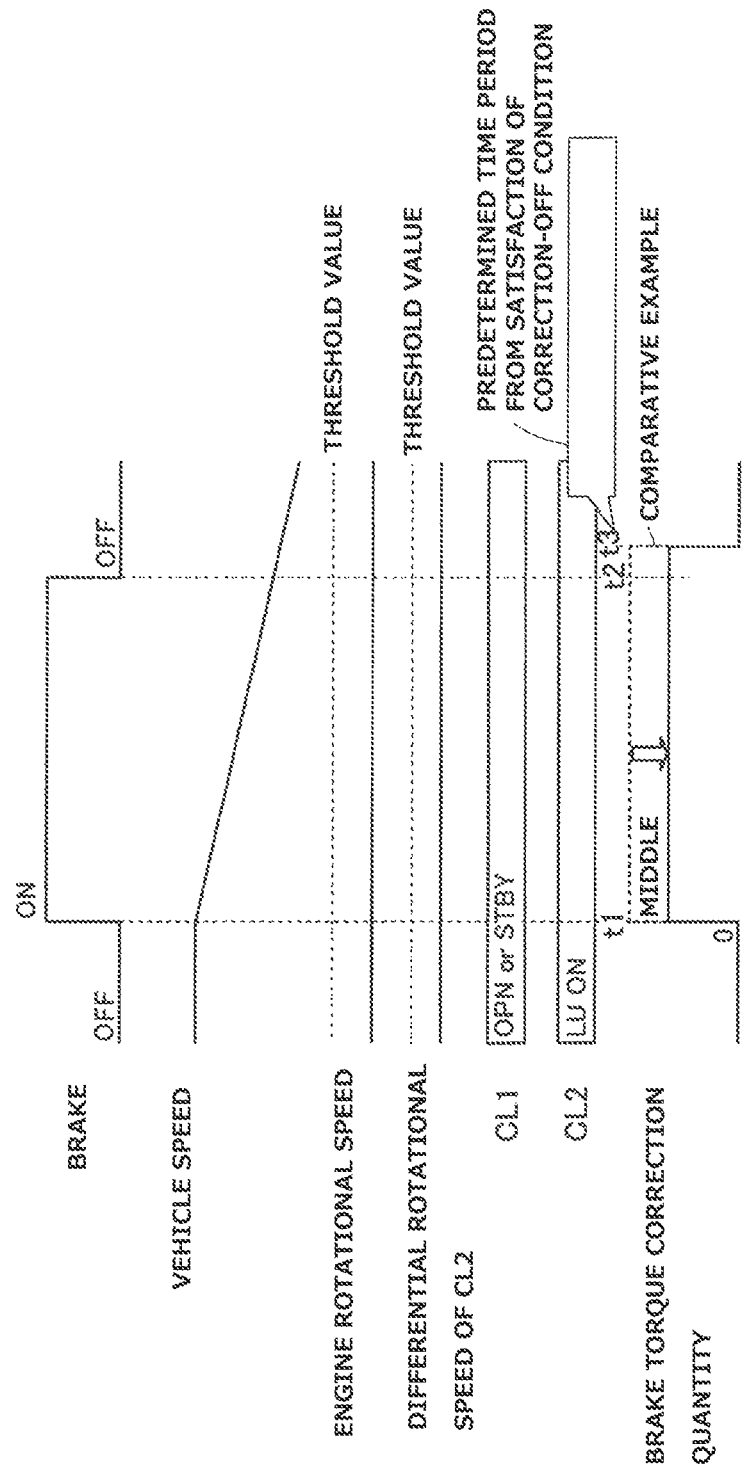
FIG. 5 is a time chart showing characteristics of the brake, the vehicle speed, the engine rotational speed, the differential rotational speed, the state of CL1, the state of CL2, and the brake torque correction quantity, when the EV mode is selected in the FF hybrid vehicle according to the first embodiment.
Figure 6:
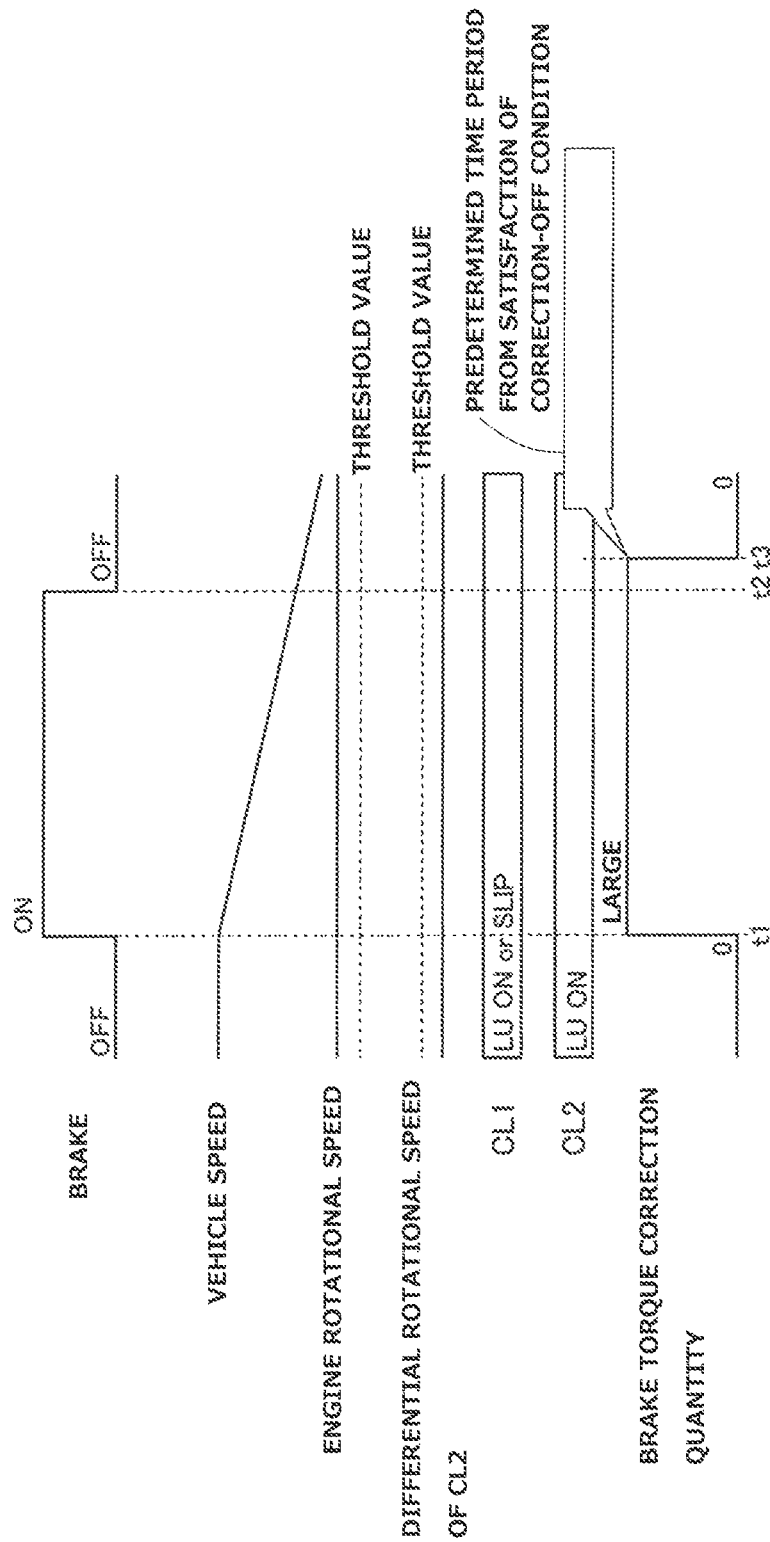
FIG. 6 is a time chart showing characteristics of the brake, the vehicle speed, the engine rotational speed, the differential rotational speed, the state of CL1, the state of CL2, and the brake torque correction quantity, when the HEV mode is selected in the FF hybrid vehicle according to the first embodiment.
Figure 7:
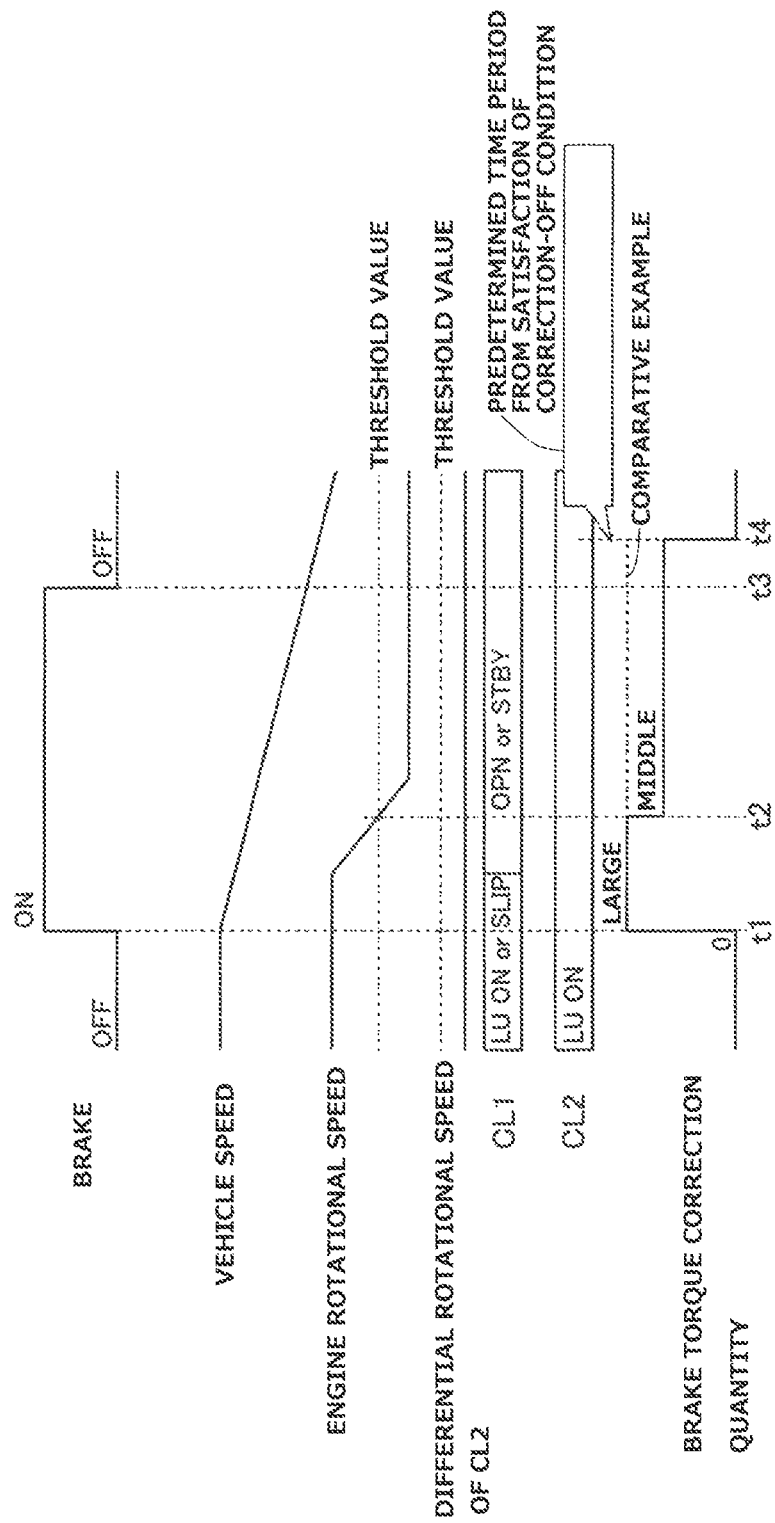
FIG. 7 is a time chart showing characteristics of the brake, the vehicle speed, the engine rotational speed, the differential rotational speed, the state of CL1, the state of CL2, and the brake torque correction quantity, when a mode shift occurs from the HEV mode to the EV mode in the FF hybrid vehicle according to the first embodiment.
Figure 8:
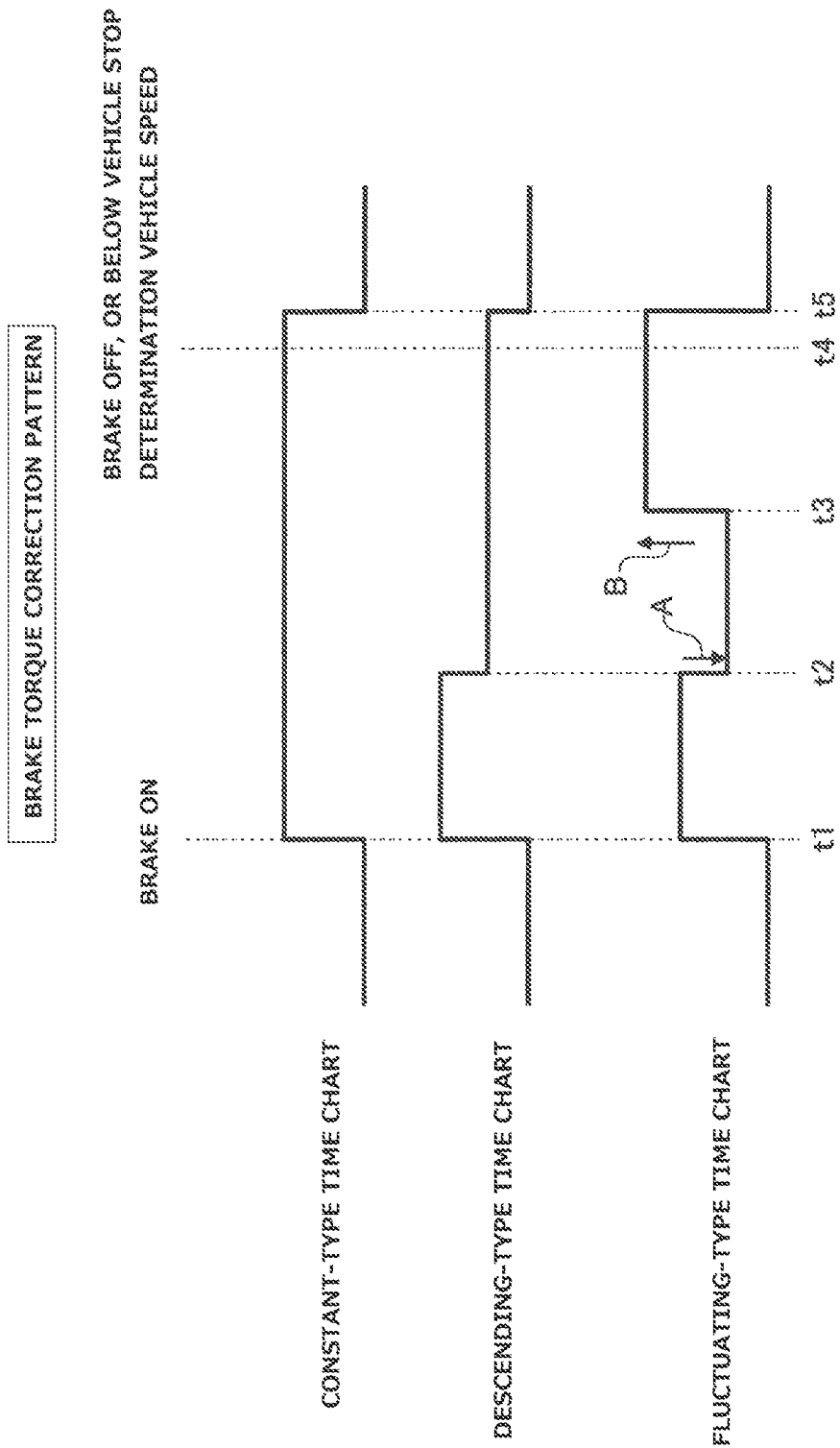
FIG. 8 is a time chart showing characteristics of a constant-type pattern of brake torque correction, a descending-type pattern of brake torque correction, and a fluctuating-type pattern of brake torque correction, which are employed in the FF hybrid vehicle according to the first embodiment.

[Action of Process of Pulley Pressure Correction Control Under Brake-Deceleration] FIG. 4 is a time chart showing a situation where the WSC mode is selected. FIG. 5 is a time chart showing a situation where the EV mode is selected. FIG. 6 is a time chart showing a situation where the HEV mode is selected. FIG. 7 is a time chart showing a situation where a mode shift occurs from the HEV mode to the EV mode. FIG. 8 shows characteristics of a constant-type pattern of brake torque correction, a descending-type pattern of brake torque correction, and a fluctuating-type pattern of brake torque correction. The following describes actions of the process of pulley pressure correction control under brake-deceleration along with the patterns of brake torque correction, with reference to FIGS. 4 to 8.

First, when no brake operation is present, the process proceeds as Step S1 ->Step S3 ->the end in the flow chart of FIG. 2. When brake operation is present with selection of the range position other than the D-range and the R-range, the process proceeds as Step S1 ->Step S2 ->Step S3 ->the end in the flow chart of FIG. 2. In each situation, no pulley pressure correction is performed.

When brake operation is present, and the range signal is indicative of the D-range or the R-range, and the ABS is active, the process proceeds as Step S1 ->Step S2 ->Step S4 ->Step S5 ->Step S11 in the flow chart of FIG. 2. At Step S5, the brake torque correction quantity based on the HEV inertia quantity is calculated, and the pulley pressure command values of primary pulley pressure Ppri and secondary pulley pressure Psec are determined. Namely, when the ABS is active, the brake torque correction quantity is set to the large HEV inertia quantity (see FIG. 6). Then, the HEV inertia quantity as the inertia torque correction component is added to the input torque component inputted to belt-type continuously variable transmission 6 such as the hydraulic torque and the regenerative torque, to obtain a total torque, and the pulley pressure command values of primary pulley pressure Ppri and secondary pulley pressure Psec are determined to achieve the total torque.

When brake operation is present, and the range signal is indicative of the D-range or the R-range, and it is in the state of the WSC mode, the process proceeds as Step S1 ->Step S2 ->Step S4 ->Step S6 ->Step S7 ->Step S11 in the flow chart of FIG. 2. At Step S7, the brake torque correction quantity based on the WSC inertia quantity is calculated, and the pulley pressure command values of primary pulley pressure Ppri and secondary pulley pressure Psec are determined. Namely, when the WSC mode is selected, the brake torque correction quantity is set to the small WSC inertia quantity as shown in FIG. 4. Then, the WSC inertia quantity as the inertia torque correction component is added to the input torque component inputted to belt-type continuously variable transmission 6 such as the hydraulic torque and the regenerative torque, to obtain a total toque, and the pulley pressure command values of primary pulley pressure Ppri and secondary pulley pressure Psec are determined to achieve the total torque.

In FIG. 4, a time instant t1 is a time instant when the start condition of the pulley pressure correction control is satisfied. A time instant t2 in FIG. 4 is a time instant when the cancelling condition of the pulley pressure correction control is satisfied based on the vehicle speed condition (vehicle speed ≤ vehicle stop determination vehicle speed). A time instant t3 in FIG. 4 is a time instant when the brake torque correction quantity has decreased to zero. When the WSC mode is selected, the engine rotational speed is lower than or equal to a threshold value, which indicates a stationary state of the vehicle, and the differential rotational speed of CL2 is higher than or equal to a threshold value, which indicates a state of slip-engagement of CL2, and first clutch CL1 is in disengaged state or in standby-state.

When brake operation is present, and the range signal is indicative of the D-range or the R-range, and it is in the state of the EV mode, the process proceeds as Step S1 ->Step S2

->Step S4 ->Step S6 ->Step S8 ->Step S9 ->Step S11 in the flow chart of FIG. 2. At Step S9, the brake torque correction quantity based on the EV inertia quantity is calculated, and the pulley pressure command values of primary pulley pressure Ppri and secondary pulley pressure Psec are determined. Namely, when the EV mode is selected, the brake torque correction quantity is set to the middle EV inertia quantity, which is smaller than in a comparative example with a large brake torque correction quantity as indicated by a broken line, as shown in FIG. 5. Then, the EV inertia quantity as the inertia torque correction component is added to the input torque component inputted to belt-type continuously variable transmission 6 such as the hydraulic torque and the regenerative torque, to obtain a total torque, and the pulley pressure command values of primary pulley pressure Ppri and secondary pulley pressure Psec are determined to achieve the total torque.

In FIG. 5, a time instant t1 is a time instant when the start condition of the pulley pressure correction control is satisfied. A time instant t2 in FIG. 5 is a time instant when the cancelling condition of the pulley pressure correction control is satisfied based on the brake operation condition (brake-on to brake-off). A time instant t3 in FIG. 5 is a time instant when the brake torque correction quantity has decreased to zero. When the EV mode is selected, the engine rotational speed is lower than or equal to the threshold value, which indicates a stationary state of the vehicle, and the differential rotational speed of CL2 is lower than or equal to the threshold value, which indicates a state of engagement of CL2, and first clutch CL1 is in disengaged state or in standby-state.

When brake operation is present, and the range signal is indicative of the D-range or the R-range, and it is in the state of the HEV mode, the process proceeds as Step S1 ->Step S2 ->Step S4 ->Step S6 ->Step S8 ->Step S10 ->Step S11 in the flow chart of FIG. 2. At Step S10, the brake torque correction quantity based on the HEV inertia quantity is calculated, and the pulley pressure command values of primary pulley pressure Ppri and secondary pulley pressure Psec are determined. Namely, when the HEV mode is selected, the brake torque correction quantity is set to the large HEV inertia quantity, as shown in FIG. 6. Then, the HEV inertia quantity as the inertia torque correction component is added to the input torque component inputted to belt-type continuously variable transmission 6 such as the hydraulic torque and the regenerative torque, to obtain a total torque, and the pulley pressure command values of primary pulley pressure Ppri and secondary pulley pressure Psec are determined to achieve the total torque.

In FIG. 6, a time instant t1 is a time instant when the start condition of the pulley pressure correction control is satisfied. A time instant t2 in FIG. 6 is a time instant when the cancelling condition of the pulley pressure correction control is satisfied based on the brake operation condition (brake-on to brake-off). A time instant t3 in FIG. 6 is a time instant when the brake torque correction quantity has decreased to zero. When the HEV mode is selected, it is in a state of operation where the engine rotational speed is higher than or equal to the threshold value, and the differential rotational speed of CL2 is lower than or equal to the threshold value, which indicates a state of engagement of CL2, and first clutch CL1 is in engaged state (LU ON) or in slip-state.

As the drive mode shifts from the HEV mode to the EV mode when the range signal is indicative of the D-range or the R-range and brake operation is present, the process proceeds as Step S1 ->Step S2 ->Step S4 ->Step S6 ->Step S8 ->Step S10 ->Step S11, and thereafter from Step S11, the process proceeds as Step S4 ->Step S6 ->Step S8 ->Step S9 ->Step S11, in the flow chart of FIG. 2. At Step S10, the brake torque correction quantity based on the HEV inertia quantity is calculated, and at Step S9, the brake torque correction quantity based on the EV inertia quantity is calculated. Namely, during a period from time instant t1 to time instant t2 where the HEV mode is selected, the brake torque correction quantity is set to the large HEV inertia quantity as shown in FIG. 7, whereas during a period from time instant t2 to time instant t3 where the EV mode is selected, the brake torque correction quantity is set to the middle EV inertia quantity as shown in FIG. 7 which is smaller than in a comparative example with a large brake torque correction quantity as indicated by a broken line.

In FIG. 7, a time instant t1 is a time instant when the start condition of the pulley pressure correction control is satisfied. A time instant t2 in FIG. 7 is a time instant of mode shift which is determined by a condition of engine rotational speed. A time instant t3 in FIG. 7 is a time instant when the cancelling condition of the pulley pressure correction control is satisfied based on the brake operation condition (brake-on to brake-off). A time instant t4 in FIG. 7 is a time instant when the brake torque correction quantity has decreased to zero. A section where the engine rotational speed is higher than or equal to the threshold value is identified as a section of the HEV mode, whereas a section where the engine rotational speed is lower than the threshold value is identified as a section of the EV mode. The differential rotational speed of CL2 is lower than or equal to the threshold value, which indicates the engaged state of CL2, and first clutch CL1 is shifted from engaged state (LU ON) or slip state to disengaged state or standby state.

As shown in FIG. 8, as brake torque correction patterns, it employs a constant-type brake torque correction pattern, a descending-type brake torque correction pattern, and a fluctuating-type brake torque correction pattern.

The constant-type brake torque correction pattern is configured such that the brake torque correction quantity is set to a constant value during a period from time instant t1 when the start condition of the pulley pressure correction control is satisfied, through time instant t4 when the cancelling condition is satisfied, until time instant t5 when the brake torque correction quantity has decreased to zero, corresponding to FIGS. 4 to 6. The constant-type brake torque correction pattern is selected, when no switching of first clutch CL1 and second clutch CL2 is performed, or second clutch CL2 is constantly in off-state, during the pulley pressure correction control. The brake torque correction quantity is added when the brake-on is started, in order to prevent belt 6c from slipping due to a delay of response of hydraulic pressure.

The descending-type brake torque correction pattern is configured such that the brake torque correction quantity is set to a large value during a period from time instant t1 when the start condition of the pulley pressure correction control is satisfied, to time instant t2, and is set to a middle value during a period from time instant t2 to time instant t5 when the brake torque correction quantity has decreased to zero, corresponding to FIG. 7. The descending-type brake torque correction pattern is selected, when first clutch CL1 or second clutch CL2 is switched into off-state during the pulley pressure correction control. In the mode where the correction quantity decreases, switching is performed in a situation where incorrect determination based on the magnitude of differential rotational speed is prevented and it is ensured that the clutch is disengaged. Although the pulley oil pressure decreases as the correction quantity decreases, the rate of decrease of the pulley oil pressure is limited so that no slip occurs in belt 6c due to undershooting.

The fluctuating-type brake torque correction pattern is, for example, configured such that the brake torque correction quantity is set to a middle value during a period from time instant t1 when the start condition of the pulley pressure correction control is satisfied, to time instant t2, and is set to a small value during a period from time instant t2 to time instant t3, and is set to a large value during a period from time instant t3 to time instant t5. The fluctuating-type brake torque correction pattern is selected, in a situation where first clutch CL1 is in off-state and second clutch CL2 is shifted from on-state into slip-engaged state, and thereafter second clutch CL2 is shifted into on state after engagement of first clutch CL1, during the pulley pressure correction control. The influence of decrease of the correction quantity as indicated by an arrow A is unproblematic similar to the descending-type. When the correction quantity increases as indicated by an arrow B, the correction quantity is increased immediately after the determination of clutch engagement start, in consideration of a delay of response of oil pressure.

Figure 9:
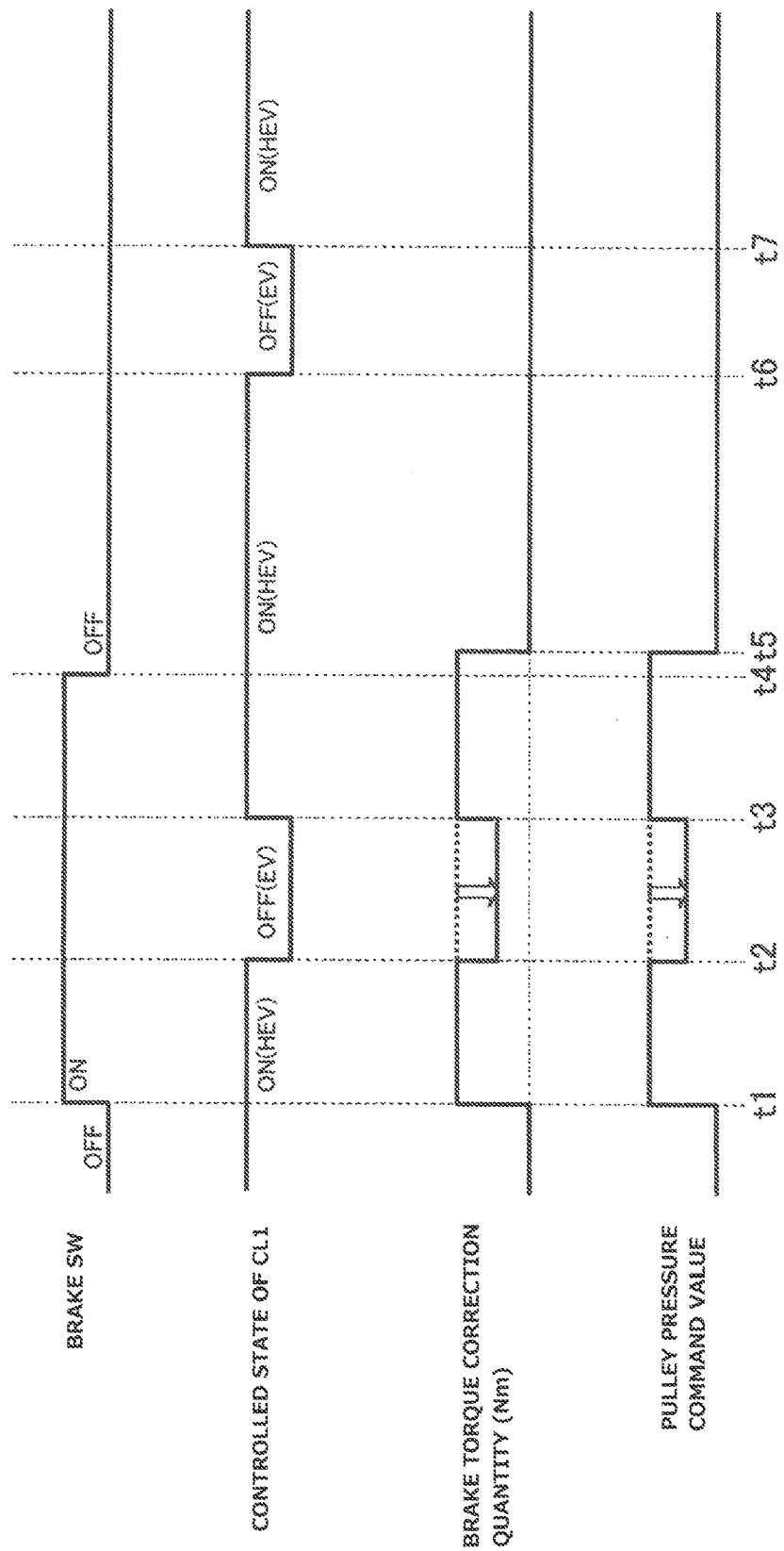
FIG. 9 is a time chart showing characteristics of a brake SW, a controlled state of CL1, a motor rotational speed, the engine rotational speed, the brake torque correction quantity, and a secondary pulley pressure command value, when the brake is shifted from an active state to a released state along with mode shifting in the FF hybrid vehicle according to the first embodiment.

[Action of Pulley Pressure Correction Control Under Brake-Deceleration and Others] FIG. 9 is a time chart in a situation where the brake is shifted from an active state to a released state along with mode shifting. The following describes actions of the pulley pressure correction control under brake-deceleration and others with reference to FIG. 9. In FIG. 9, a time instant t1 is a time instant when the start condition of the pulley pressure correction control is satisfied. A time instant t2 is a time instant when the brake torque correction quantity decreases. A time instant t3 is a time instant when the brake torque correction quantity increases. A time instant t4 is a time instant when the cancelling condition of the pulley pressure correction control is satisfied. A time instant t5 is a time instant when the brake torque correction quantity has decreased to zero. A time instant t6 is a time instant when a mode shift occurs from the HEV mode to the EV mode. A time instant t7 is a time instant when a mode shift occurs from the EV mode to the HEV mode.

When the brake is turned from off-state to on-state at time instant t1 when the HEV mode is selected, the first clutch CL1 is maintained in the engaged state until time instant t2 when the HEV mode is maintained, so that the brake torque correction quantity is set to the large correction quantity based on the HEV inertia quantity. As a mode shift occurs to the EV mode at time instant t2, first clutch CL1 is in the disengaged state during a period from time instant t2 to time instant t3 so that the brake torque correction quantity is set to the middle correction quantity based on the EV inertia quantity. Accordingly, the pulley pressure command values are set smaller than the comparative example (indicated by a broken line) where the brake torque correction quantity is set to the large correction quantity. At time instant t3, a mode shift occurs to the HEV mode, and first clutch CL1 is brought into the engaged state. When the brake is turned from on-state to off-state at time instant t4, the brake torque correction quantity is set to the large correction quantity based on the HEV inertia quantity during a period from time instant t3 to time instant t5.

After time instant t5, a mode shift occurs from the HEV mode to the EV mode at time instant t6 so that first clutch CL1 is brought into the engaged state. Thereafter, a mode shift occurs from the EV mode to the HEV mode at time instant t7 so that first clutch CL1 is brought into the disengaged state. However, after time instant t5, since the brake is in off-state, and the brake-on condition as a condition for the brake torque correction is unsatisfied, the brake torque correction and the pulley pressure command value correction are not performed.

Figure 10:
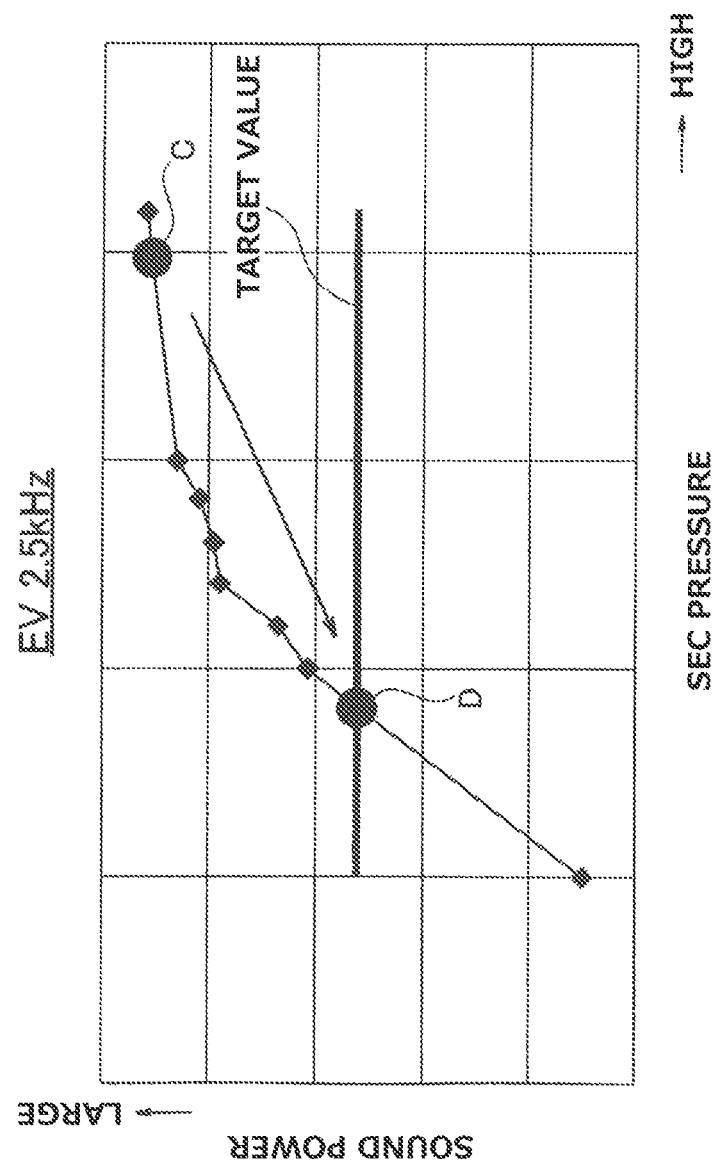
FIG. 10 is an effect verification diagram showing a comparative effect for reducing noise of a belt under brake-deceleration with the EV mode selected.

[Characteristic Action of Pulley Pressure Correction Control] The first embodiment is configured such that the brake torque correction quantity under brake-deceleration with the EV mode selected is set smaller than that with the HEV mode selected. The components of the driveline to be considered to determine the brake torque correction quantity as the inertia torque correction component in the EV mode are different than those in the HEV mode. Specifically, in the EV mode where only motor generator 4 is employed as a drive source, the inertia torque is smaller than in the HEV mode where transversely mounted engine 2 and motor generator 4 are employed as drive sources. Accordingly, the brake torque correction quantity in the EV mode where transversely mounted engine 2 is not in direct connection to belt-type continuously variable transmission 6, is treated independently of the brake torque correction quantity in the HEV mode, and is set smaller in conformance with the inertia torque in the EV mode than when the HEV mode is selected. This serves to suppress belt noise in belt-type continuously variable transmission 6 from being adversely affected under brake-deceleration with the EV mode selected. This effect was tested by an experiment for comparison between a comparative example where the secondary pulley pressure is set based on the HEV inertia quantity in the EV mode (frequency of 2.5 kHz) and the first embodiment where the secondary pulley pressure is set based on the EV inertia quantity. The result of the test shows that as shown in FIG. 10, in contrast to the comparative example where sound power is represented by a point C, the sound power of the first embodiment is reduced at a point D so that a target value of reduction of the belt noise is achieved, and the effectiveness of suppressing the adverse effect of the belt noise is confirmed. In the EV mode, the engine is at rest so that belt noise has a larger influence on a driver as compared to a condition where the engine is driven in the HEV mode. However, by the reduction of belt noise in the EV mode, it is possible to reduce the influence on a driver even when the engine is at rest. Incidentally, the mechanism for causing noise has not yet been analyzed clearly, but a phenomenon has been confirmed that a sound occurs when an element of belt 6c gets caught by a sheave surface of secondary pulley 6b, and the sound increases as the catching force (pulley thrust force) at the moment increases.

The first embodiment is configured such that the brake torque correction quantity under brake-deceleration with the EV mode selected, is set to the EV inertia quantity based on the inertia torque of the combination of motor generator 4, second clutch 5, and primary pulley 6a. The brake torque correction quantity under brake-deceleration with the HEV mode selected, is set to the HEV inertia quantity based on the inertia torque of the combination of motor generator 4, second clutch 5, and primary pulley 6a, and further, transversely mounted engine 2 and first clutch 3. Namely, the components of the driveline to be considered to determine the brake torque correction quantity as the inertia torque correction component is set suitably in different manners for the EV mode and the HEV mode. This serves to obtain precisely the EV inertia quantity and the HEV inertia quantity as the brake torque correction quantity.

The first embodiment is configured such that the brake torque correction quantity under brake-deceleration with the WSC mode selected is set smaller than that with the EV mode selected. In the WSC mode, second clutch 5 is slip-engaged. Accordingly, the components upstream of second clutch 5 in the driveline are excluded from the components of the driveline to be considered to determine the brake torque correction quantity as the inertia torque correction component in the WSC mode. Under brake-deceleration with the WSC mode selected, this serves to suppress the adverse effect on belt noise in belt-type continuously variable transmission 6.

The first embodiment is configured such that the brake torque correction quantity under brake-deceleration with the WSC mode selected, is set to the WSC inertia quantity based on the inertia torque of the combination of second clutch 5 and primary pulley 6*a*. Specifically, the components upstream of second clutch 5 in the driveline are excluded, and second clutch 5 and primary pulley 6*a* are selected as components of the driveline to be considered to determine the WSC inertia quantity. This serves to obtain precisely the WSC inertia quantity when the WSC mode is selected. It may be configured such that when the WSC mode is selected, the transmission torque capacity of second clutch 5 is added to the WSC inertia quantity. This serves to suppress the adverse effect on belt noise while preventing belt slip even when an inertia torque is inputted via second clutch 5.

The first embodiment is configured such that the brake torque correction quantity during the ABS-active condition where the ABS control is active under brake-deceleration, is set to the HEV inertia quantity independently of which drive mode is selected. The ABS control is implemented by repeating reduction, holding, and increase of brake fluid pressure, at hard braking or the like. If a belt slip occurs in belt-type continuously variable transmission 6 when the ABS is active, it adversely affects the function of the ABS control where braking lock is suppressed by release of braking force. Accordingly, when the ABS is active, it is required to suppress belt slip reliably even if the input torque to belt-type continuously variable transmission 6 has significant fluctuations. The function of the ABS control can be ensured by using the large HEV inertia quantity for correction quantity when the ABS is active. When the ABS is active, front and rear wheels 10L, 10R, 11L, and 11L are controlled between rotating state and non-rotating state repeatedly in a short cycle so that vibration of the vehicle is large and belt noise is unproblematic relatively.

The first embodiment is configured such that when the condition for cancelling the pulley pressure correction control is satisfied, the brake torque correction quantity is maintained for the predetermined period from the satisfaction of the cancelling condition, and is thereafter reduced. For example, if the brake torque correction quantity is reduced immediately after the cancelling condition is satisfied, in a situation where brake-on operation occurs by re-depression immediately after brake-off operation, the pulley oil pressure falls due to a delay of response of rise of oil pressure with respect to a delay of response of fall of oil pressure. In contrast, the configuration that when the condition for cancelling the pulley pressure correction control is satisfied, the brake torque correction quantity is maintained for the predetermined period from the satisfaction of the cancelling condition, serves to prevent the pulley oil pressure from falling in a situation where brake-on operation occurs by re-depression immediately after brake-off operation.

The following describes effects. The control device for the FF hybrid vehicle according to the first embodiment produces the following listed effects.

<1> A hybrid vehicle control device for a hybrid vehicle (FF hybrid vehicle), wherein: the hybrid vehicle includes a driveline, wherein the driveline includes an engine (transversely mounted engine 2), a motor (motor generator 4), and a belt-type continuously variable transmission (6); the belt-type continuously variable transmission (6) includes a primary pulley (6*a*), a secondary pulley (6*b*), and a belt (6*c*), wherein the belt (6*c*) is wound over the primary pulley (6*a*) and the secondary pulley (6*b*), and configured to be clamped by a primary pulley pressure (Ppri) at the primary pulley (6*a*) and a secondary pulley pressure (Psec) at the secondary pulley (6*b*); and the hybrid vehicle employs an HEV mode and an EV mode as drive modes, wherein the HEV mode employs the engine (transversely mounted engine 2) and the motor (motor generator 4) as drive sources, and wherein the EV mode employs the motor (motor generator 4) as a drive source without employing the engine (transversely mounted engine 2) as a drive source; the hybrid vehicle control device includes a pulley pressure correction control means (CVT control unit 84) configured to determine the primary pulley pressure (Ppri) and the secondary pulley pressure (Psec), based on an input torque component inputted to the belt-type continuously variable transmission (6), and a brake torque correction quantity as an inertia torque correction component, under brake-deceleration; wherein the pulley pressure correction control means (CVT control unit 84, FIG. 2) is further configured to set smaller the brake torque correction quantity under brake-deceleration with the EV mode selected than that with the HEV mode selected. This configuration serves to suppress belt noise of belt-type continuously variable transmission 6 from being adversely affected under brake-deceleration with the EV mode selected.

<2> The hybrid vehicle control device is further configured such that: the driveline further includes a first clutch (3) and a second clutch (5), wherein the first clutch (3) is configured to selectively connect and disconnect the engine (transversely mounted engine 2) to and from the motor (motor generator 4), and wherein the second clutch (5) is configured to selectively connect and disconnect the motor (motor generator 4) to and from the belt-type continuously variable transmission (6); the pulley pressure correction control means (CVT control unit 84, FIG. 2) is further configured to set the brake torque correction quantity under brake-deceleration with the EV mode selected, to an EV inertia quantity based on an inertia torque of a combination of the motor (motor generator 4), the second clutch (5), and the primary pulley (6*a*); and the pulley pressure correction control means (CVT control unit 84, FIG. 2) is further configured to set the brake torque correction quantity under brake-deceleration with the HEV mode selected, to an HEV inertia quantity based on an inertia torque of a combination of the motor (motor generator 4), the second clutch (5), the primary pulley (6*a*), the engine (transversely mounted engine 2), and the first clutch (3). This configuration serves to precisely obtain the EV inertia quantity and the HEV inertia quantity as the brake torque correction quantity, in addition to the effect of <1>.

<3> The hybrid vehicle control device is further configured such that: the hybrid vehicle employs a WSC mode in addition to the HEV mode and the EV mode, wherein the WSC mode is configured to engage the first clutch (3) and slip-engage the second clutch (5); and the pulley pressure correction control means (CVT control unit 84, FIG. 2) is further configured to set smaller the brake torque correction quantity under brake-deceleration with the WSC mode selected than that with the EV mode selected. This configuration serves to suppress belt noise of belt-type continuously variable transmission 6 from being adversely affected under brake-deceleration with the WSC mode selected, in addition to the effect of <2>.

<4> The hybrid vehicle control device is further configured such that the pulley pressure correction control means (CVT control unit 84, FIG. 2) is further configured to set the brake torque correction quantity under brake-deceleration with the WSC mode selected, to a WSC inertia quantity based on an inertia torque of a combination of the second clutch (5) and the primary pulley (6*a*). This configuration serves to precisely obtain the WSC inertia quantity when the WSC mode is selected, in addition to the effect of <3>.

<5> The hybrid vehicle control device is further configured such that: the hybrid vehicle includes a brake system, wherein the brake system includes an antilock brake control means (brake control unit 85) configured to suppress braking lock of a braked wheel by brake fluid pressure control when brake operation is active; and the pulley pressure correction control means (CVT control unit 84, FIG. 2) is further configured to set the brake torque correction quantity under brake-deceleration in an ABS-active state where an antilock brake control is active, to the HEV inertia quantity, independently of which drive mode is selected. This configuration serves to ensure the function of the ABS control to suppress braking lock by using the HEV inertia quantity for large correction when the ABS is active, in addition to the effects of <1> to <4>.

<6> The hybrid vehicle control device is further configured such that: the pulley pressure correction control means (CVT control unit 84, FIG. 2) is further configured to perform a first operation in response to a satisfaction of a condition for cancelling a pulley pressure correction control; and the first operation includes: maintaining the brake torque correction quantity for a predetermined time period from the satisfaction of the condition for cancelling; and thereafter reducing the brake torque correction quantity. This configuration serves to prevent the pulley oil pressure from falling when brake-on operation by re-depression occurs immediately after the condition for cancelling the pulley pressure correction control is satisfied, in addition to the effects of <1> to <5>.

Although the hybrid vehicle control device according to the present invention has been described with reference to the first embodiment as described above, specific configuration of the present invention is not limited to the first embodiment, but may be carried out with design modification and addition without going out of the substance of the present invention related to the present claims.

The first embodiment has the exemplified configuration where the hybrid driveline includes first clutch 3 between transversely mounted engine 2 and motor generator 4, and first clutch 3 is selectively engaged and disengaged to shift between the EV mode and the HEV mode. However, the hybrid driveline may be configured such that a power distribution mechanism such as one employing a planetary gearset is employed to shift between the EV mode and the HEV mode.

The first embodiment is has the exemplified configuration where the control device according to the present invention is applied to the FF hybrid vehicle. However, the control device according to the present invention may be applied to FR hybrid vehicles, and 4WD hybrid vehicles, etc. In summary, the control device according to the present invention may be applied to any hybrid vehicle which includes an engine and a motor and a belt-type continuously variable transmission in a driveline, and employs an HEV mode and an EV mode as drive modes.

The invention claimed is:

1. A hybrid vehicle control device for a hybrid vehicle, wherein:
   the hybrid vehicle includes a driveline, wherein the driveline includes an engine, a motor, and a belt-type continuously variable transmission;
   the belt-type continuously variable transmission includes a primary pulley, a secondary pulley, and a belt, wherein the belt is wound over the primary pulley and the secondary pulley, and configured to be clamped by a primary pulley pressure at the primary pulley and a secondary pulley pressure at the secondary pulley; and
   the hybrid vehicle employs an HEV mode and an EV mode as drive modes, wherein the HEV mode employs the engine and the motor as drive sources, and wherein the EV mode employs the motor as a drive source without employing the engine as a drive source;
   the hybrid vehicle control device comprising a pulley pressure correction control section configured to determine the primary pulley pressure and the secondary pulley pressure, based on an input torque component inputted to the belt-type continuously variable transmission, and a brake torque correction quantity as an inertia torque correction component, under brake-deceleration;
   wherein the pulley pressure correction control section is further configured to set smaller the brake torque correction quantity under brake-deceleration with the EV mode selected than that with the HEV mode selected.

2. The hybrid vehicle control device as claimed in claim 1, wherein:
   the driveline further includes a first clutch and a second clutch, wherein the first clutch is configured to selectively connect and disconnect the engine to and from the motor, and wherein the second clutch is configured to selectively connect and disconnect the motor to and from the belt-type continuously variable transmission;
   the pulley pressure correction control section is further configured to set the brake torque correction quantity under brake-deceleration with the EV mode selected, to an EV inertia quantity based on an inertia torque of a combination of the motor, the second clutch, and the primary pulley; and
   the pulley pressure correction control section is further configured to set the brake torque correction quantity under brake-deceleration with the HEV mode selected, to an HEV inertia quantity based on an inertia torque of a combination of the motor, the second clutch, the primary pulley, the engine, and the first clutch.

3. The hybrid vehicle control device as claimed in claim 2, wherein:
   the hybrid vehicle employs a WSC mode in addition to the HEV mode and the EV mode, wherein the WSC mode is configured to engage the first clutch and slip-engage the second clutch; and
   the pulley pressure correction control section is further configured to set smaller the brake torque correction quantity under brake-deceleration with the WSC mode selected than that with the EV mode selected.

4. The hybrid vehicle control device as claimed in claim 3, wherein the pulley pressure correction control section is further configured to set the brake torque correction quantity under brake-deceleration with the WSC mode selected, to a WSC inertia quantity based on an inertia torque of a combination of the second clutch and the primary pulley.

5. The hybrid vehicle control device as claimed in claim 2, wherein:
the hybrid vehicle includes a brake system, wherein the brake system includes an antilock brake control section configured to suppress braking lock of a braked wheel by brake fluid pressure control when brake operation is active; and
the pulley pressure correction control section is further configured to set the brake torque correction quantity under brake-deceleration in an ABS-active state where an antilock brake control is active, to the HEV inertia quantity, independently of which drive mode is selected.

6. The hybrid vehicle control device as claimed in claim 1, wherein:
the pulley pressure correction control section is further configured to perform a first operation in response to a satisfaction of a condition for cancelling a pulley pressure correction control; and
the first operation includes:
maintaining the brake torque correction quantity for a predetermined time period from the satisfaction of the condition for cancelling; and
thereafter reducing the brake torque correction quantity.

* * * * *